April 10, 1928.

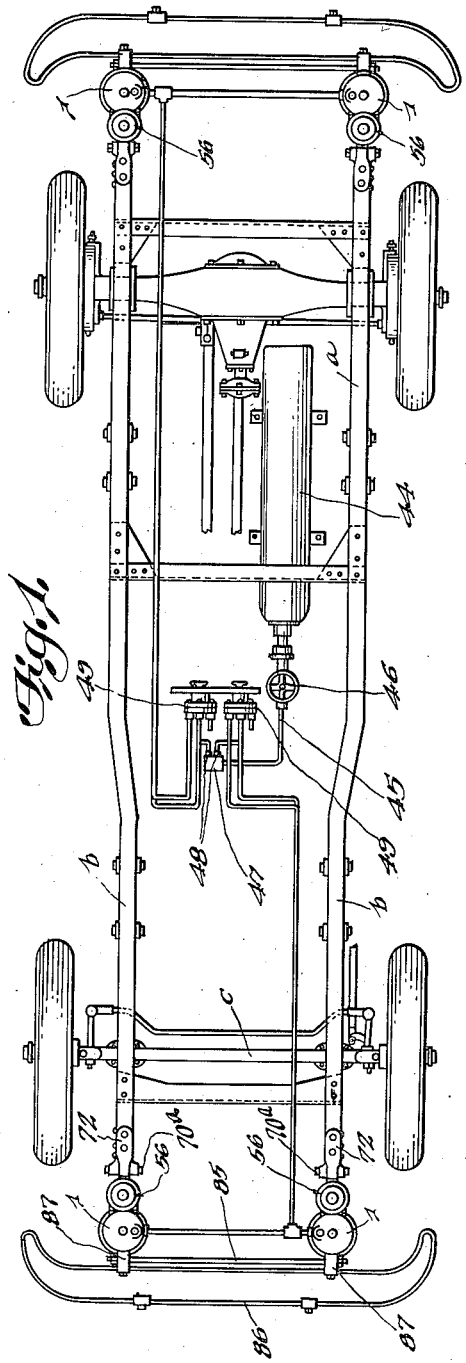

R. D. SCOTT 1,665,985

PNEUMATIC JACK

Filed Sept. 26, 1925

Raymond D. Scott
INVENTOR

BY Victor J. Evans
ATTORNEY

April 10, 1928.
R. D. SCOTT
PNEUMATIC JACK
Filed Sept. 26, 1925
1,665,985
4 Sheets-Sheet 3
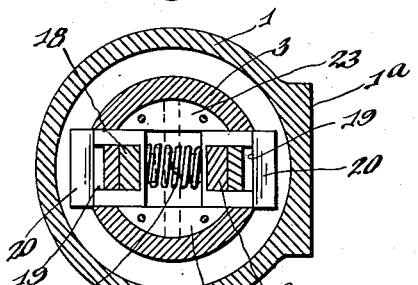
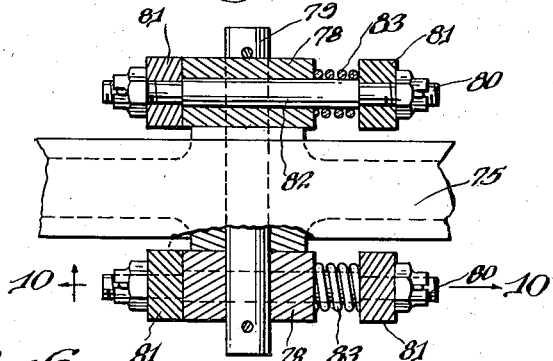
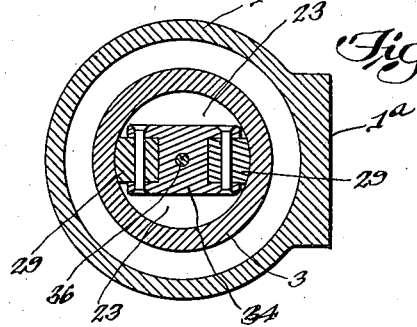
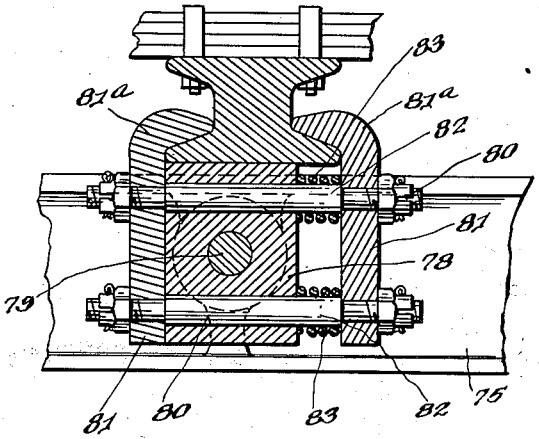
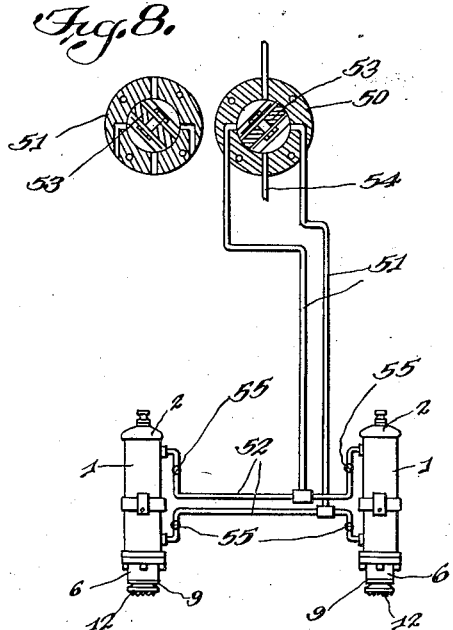
Raymond D. Scott
INVENTOR
BY Victor J. Evans
ATTORNEY April 10, 1928.

R. D. SCOTT 1,665,985

PNEUMATIC JACK

Filed Sept. 26, 1925

Raymond D. Scott
INVENTOR.

BY Victor J. Evans
ATTORNEY

Patented Apr. 10, 1928.

1,665,985

UNITED STATES PATENT OFFICE.

RAYMOND D. SCOTT, OF CHICAGO, ILLINOIS.

PNEUMATIC JACK.

Application filed September 26, 1925. Serial No. 58,878.

This invention relates to automobile attachments, and more particularly to a combined pneumatic jack and shock absorber and to the means for mounting the same upon an automobile.

One of the main objects of the invention is to provide a pneumatic jack which can be permanently applied to an automobile and can be operated in such manner as to raise any desired wheel of the automobile out of contact with the supporting surface. A further object is to provide a jack of this character and means for operating the same of comparatively inexpensive construction. A further object is to provide simple and efficient means whereby the active member of the jack can be automatically locked in either operative or inoperative position. Another object is to provide a jack and shock absorber of simple and efficient construction which can be readily applied to the automobile and which utilizes a combined vacuum and compression effect, in conjunction with a cushion member for absorbing shocks. Another object is to provide a shock absorber of the character stated which can be quickly and easily applied and the effective strength of which can be easily regulated. A still further object is to provide means in conjunction with a jack and the shock absorber for supporting a bumper in such manner as to effectually prevent injury to parts due to impact of the bumper with objects. Further objects will appear from the detailed description.

In the drawings:

Fig. 1 is a plan view of the jack and shock absorber and associated parts as applied to an automobile chassis of known construction.

Fig. 2 is a side view of the same.

Fig. 5 is a section taken substantially on line 5—5 of Fig. 3.

Fig. 6 is a section taken substantially on line 6—6 of Fig. 3.

Fig. 7 is a diagram of the connections between one of the control valves and jacks showing the valve in position to extend the jacks.

Fig. 8 is a section through one of the control valves showing the valve in position to move the jacks into inoperative position.

Fig. 9 is a plan view partly in section, of the means for attaching one of the front supporting bars to the front axle of the automobile.

Fig. 10 is a section taken substantially on line 10—10 of Fig. 9.

Figures 3, 4:
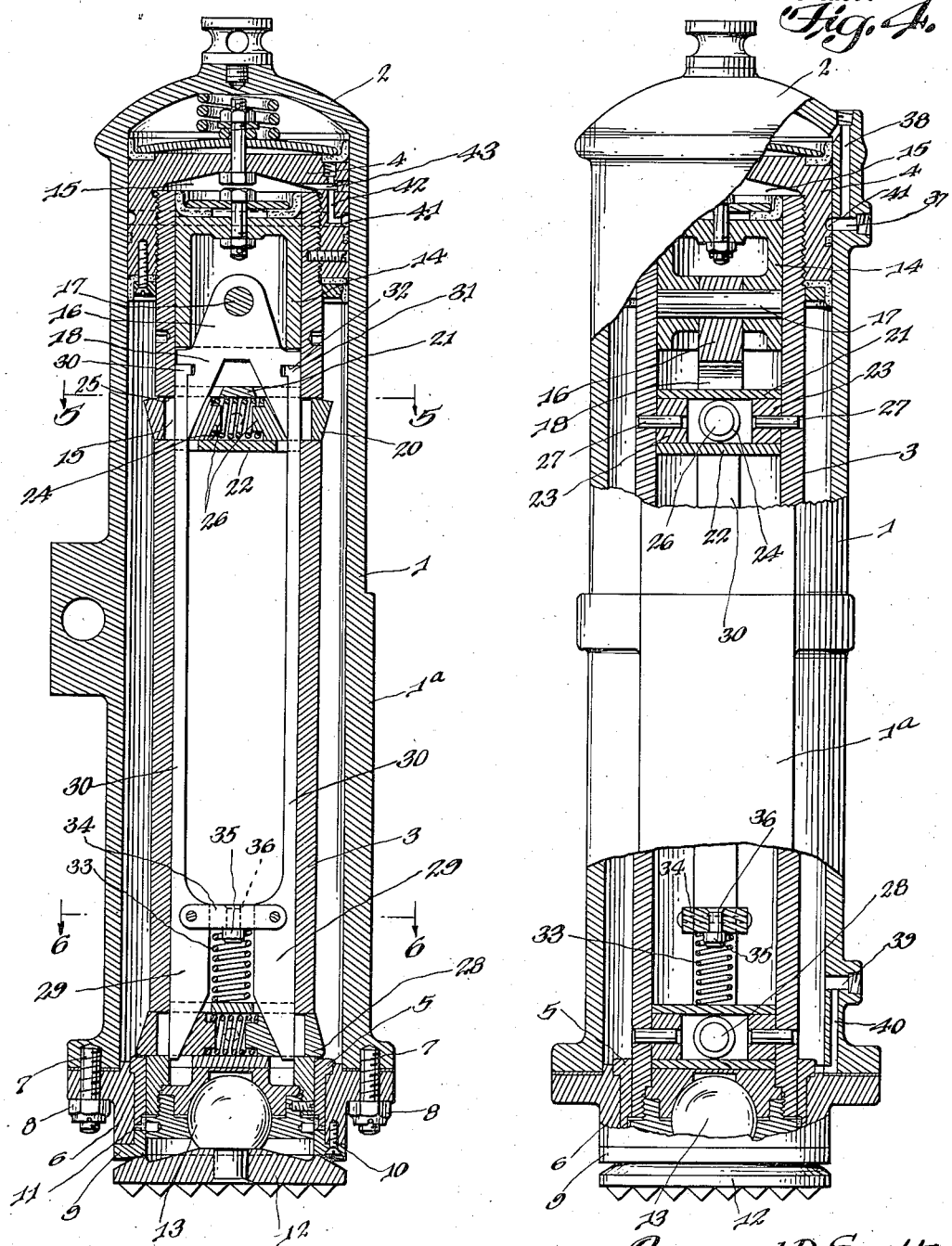
Fig. 3 is a central vertical sectional view through the jack.
Fig. 4 is an elevation of the jack partly broken away and sectioned in a plane at right angles to the plane of the section of Fig. 3.
Figure 11:
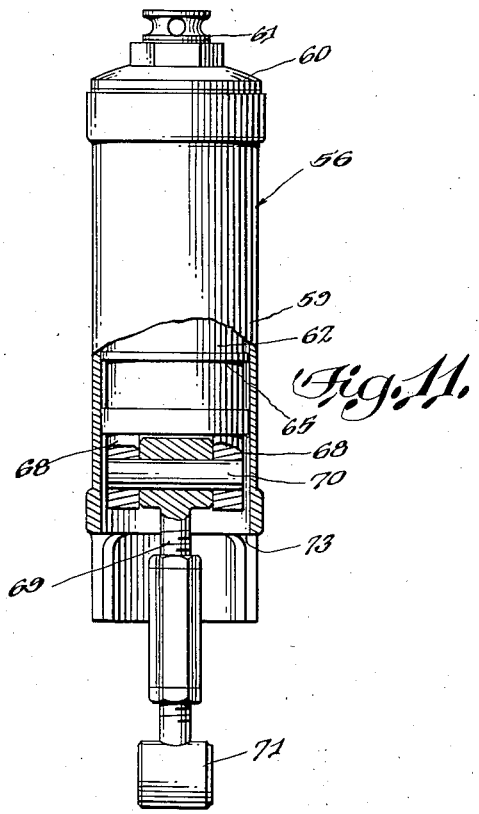
Fig. 11 is an elevation partly broken away and partly in section of the shock absorber.

The jack includes a cylinder 1 closed at its upper end by a head 2 and provided at its lower end with an opening which accommodates a barrel 3 depending from and secured to a main piston 4 operating in the cylinder. A flanged bearing ring 5 fits snugly about barrel 3 and is supported by a flanged collar 6 secured by means of screw studs 7 and ends 8, or in any other suitable or preferred manner, to the lower end of cylinder 1. A clamping ring 9 is secured to collar 6 by means of screws 10 and cooperates with ring 5 for holding a packing gasket 11 which forms a tight closure about barrel 3. A serrated foot 12 is secured to the lower end of barrel 3 by ball and socket connections 13 which permit movement of the foot relative to the barrel to conform to the shape or inclination of the supporting surface upon which the automobile stands when the barrel is projected into operative position.

A supplemental piston 14 operates in barrel 3 adjacent the upper end thereof and is, when in its uppermost position, spaced away from main piston 4 to leave an air-receiving space 15. A cross-head 16 is secured to piston 14 for movement therewith by a wrist pin 17. This cross-head is provided with two depending arms 18 which extend into slots 19 of a pair of locking dogs 20. These dogs are slidably mounted for movement radially of barrel 3 in a guide member which includes upper and lower plates 21 and 22, respectively, which are secured to spacing blocks 23 by rivets, or in any other suitable or preferred manner. The blocks 23 are spaced apart and slidably receive between them the dogs 20 which are held projected, by means of an expansion coil spring 24 confined within the inner ends of the dogs so as to extend beyond the barrel 3, these dogs operating through slots 25 through the barrel. As illustrated in Figures 3 and 4, each dog is provided, at its inner end, with a reduced stud 26 about which the spring 24 fits, and pins 27 are secured through the surrounding wall of barrel 3 and end blocks 23, these pins acting to secure the guide frame for the dogs in barrel 3. As clearly illustrated in Figures 3 and 5, the plates 21 and 22 of the dog guide frames are cut away or slotted from their peripheries to accommodate the arms 18 of cross-head 16. The inner face of each arm 18 is inclined upwardly and inwardly of barrel 3 and contacts with the inner end wall of slot 19 of dog 20, serving to limit the downward movement of the dogs and also acting, when the cross-head is disposed within the barrel, to retract the dogs. A pair of holding dogs 28 similar to dogs 20 is mounted in barrel 3 adjacent the lower end thereof. As the dogs 28 are constructed and mounted in the same manner as the dogs 20 it is not necessary to describe in detail the construction and mounting of the holding dogs, but it should be noted that the operating faces of the dogs 20 are disposed upwardly whereas the operative faces of the dogs 28 are disposed downwardly, that is, the two pairs of dogs are oppositely related, as clearly illustrated in Fig. 3. The holding dogs 28 are moved into inoperative position by means of releasing heads 29 which extend into the slots of the holding dogs, the inner faces of these heads being inclined upwardly and inwardly of the barrel. Operating dogs 30 extend from the heads 29 and are provided at their upper ends with inwardly directed fingers 31 which engage into similarly shaped recesses 32 provided in the outer faces of arms 18 of heads 16. An expansion spring 33 is mounted between heads 29 and is confined between the central portion of the upper plate of the lower dog guide frame by a block 34 secured to the connecting heads 29 adjacent the upper ends thereof. The upper end of spring 33 seats about a head 35 provided on the lower end of a pin 36 secured through block 34. The spring 33 acts to normally hold the heads 29 and parts associated therewith in raised position permitting the dogs 20 and 28 to be projected about their respective springs. When the barrel 3 is in raised position the holding dogs 28 project above the upper face of ring 5 and act to hold the barrel in inoperative position within cylinder 1. The cylinder is provided adjacent its upper end with a port 37 from which extends an air duct 38 which opens into the cylinder closely adjacent the head 2, port 37 also having direct communication with the cylinder. A similar port 39 is provided adjacent the lower end of the cylinder and an air duct 40 extends from this port and communicates with the cylinder at a point closely adjacent the inner face of collar 6. The main piston 4 is provided in its outer face with a circumferentially extending air passage 41 from which extends an air duct 42 which communicates by means of a supplemental duct 43 with space 15 between the main piston and the supplemental piston 14.

This jack is extended to operative position by compressed air for which purpose tank 44 of air under high pressure may be supported in any suitable or preferred manner upon the chassis $a$ of an automobile A. The outlet of this tank is connected by a tube 45, provided with suitable valve 46, to a header 47. Inlet tubes 48 communicate with the header and with the casings of two valve structures 49 which may be mounted in any suitable position in the automobile so as to be readily accessible. Each of the valve structures includes a casing 50 with which communicate tubes 51 which are connected at their outer ends to cross-tubes 52 one of which communicates at its ends with ports 37 of the adjacent pair of jacks, the other tube communicating at its ends with the lower ports 39 of the jacks. In practice the jacks are mounted in pairs, one pair at the front of the automobile, and the other pair at the rear of the automobile, and in Fig. 7 I have shown the tubes 51 and 52 as communicating with the front jacks, though connections between the valve and casing and the rear jacks would be the same as for the front jacks. A valve 53 is mounted in casing 50 and is so constructed and arranged relative to the inlet tube 49 and the tubes 51, and the exhaust tube 54 which communicates with the tube 50, that, when the valve is in one position communication will be established between the inlet tube 49 and one of the tubes 51, and between the exhaust tube 54 and the other tube 51, and vice versa. With the tube 53 in the position illustrated in Fig. 7, air under pressure will be admitted to the upper ports 37 of cylinder 1. A portion of this air will enter the space 15 so as to depress the supplemental pistons 14 thus retracting the dogs 20 and 28 so as to permit downward movement of barrel 3 through ring 5. As soon as this action takes place the pressure of air between cylinder head 2 and the main piston will force the main piston downwardly in the cylinder, and this movement of the main piston serves to move air passage 41 out of register with port 37 so that the air under pressure is trapped between the main cylinder and the supplemental cylinder thus holding the dogs retracted until barrel 3 has been projected to its full extent. When barrel 3 is fully projected air passage 41 is brought into position to register with port 39 thus permitting escape of the air from between the supplemental piston and the main piston, this air flowing through the lower cross tube 51 communicating therewith into the casing and thence to the atmosphere by means of the exhaust tube 54. This releases the dogs so that the locking dogs 20 are provided so as to extend beyond the barrel and contact with the outer faces of clamping ring 9 thus positively locking the barrel against movement into the cylinder. In this manner the barrel can be projected so as to bring head 12 into contact with the supporting surface, continued movement of the barrel out of the cylinder serving to lift the chassis of the automobile so as to raise the wheel, or wheels, as the case may be, thereof, out of contact with the supporting surface.

In this particular instance, if both of the jacks are operated both front wheels of the automobile will be raised above the ground surface. Preferably, not necessary, the cross tubes 52 are provided with suitable valves 55 which may be normally closed to prevent operation of the jacks. When it is desired to operate any particular jack the valves adjacent that jack may be turned to manually open the same, after which the jack may be operated in the manner described. After the jack has been projected and locked in position in the manner described, and it is desired to retract the barrel 3, valve 53 is turned into the position illustrated in Fig. 8, in this particular instance communication being established between the lower cross tube 52 and the inlet tube 49, and between the upper cross tube 52 and the exhaust tube 54. This admits air by means of the port 39 and air passage 41 and dogs 42 and 43 into the space 15 moving the supplemental piston downwardly within barrel 3 so as to retract the dogs. As soon as the locking dogs 20 are returned into the barrel the pressure of air between collar 6 and the main piston 4, combined with the pressure of the load supported by the barrel, will cause upward movement of the barrel into the cylinder thus moving air passage 41 out of register with portion of port 39 so that the dogs 20 and 28 will be held in retracted position and the barrel will be returned into the cylinder by action of the air under pressure flowing into the lower portion of the cylinder through port 39 and dog 40. When the barrel has been moved into its extreme position within the cylinder 1 the air passage 41 is in register with port 37 and permit the air to escape which has been confined under pressure between the pistons, thus releasing the supplemental piston which is raised into inoperative position by means of the spring 33 and the parts associated therewith. This releases the dogs 20 and 28 which are projected into operative position, the dogs 28 extending over the inner face of ring 5 so as to lock the barrel 3 in its retracted inoperative position within cylinder 1. This provides simple and efficient means whereby any one of the wheels of an automobile upon which the jacks are mounted can be raised or, if desired, all four of the wheels can be simultaneously raised out of contact with the supporting surface.

Figure 12:
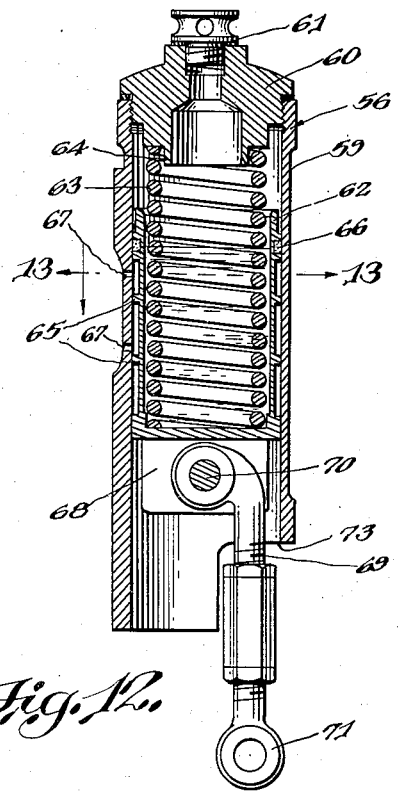
Fig. 12 is a vertical section taken through the shock absorber in a plane at right angles to the sectioned portion of Fig. 11.
Figure 13:
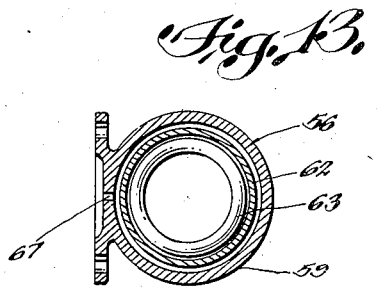
Fig. 13 is a section taken substantially on the line 13—13 of Fig. 12.

As illustrated in Figures 1 and 2, the shock absorber 56 is mounted on each jack and is rigidly secured thereto by means of nuts 57 threaded onto screw studs 58 which are secured in a thickened flattened portion $1^a$ of cylinder 1 of the jack. The shock absorber includes a cylinder 59 closed at its upper end by a head 60 having a central opening which is normally closed by a screw block 61. A hollow piston 62 open at its upper end operates in cylinder 59 and receives the lower portion of an expansion coil spring 63 which is seated in cylinder, the upper end of this spring fitting about the reduced neck 64 depending from head 60. Piston 62 is provided with two angular ribs 65 which have a working fit in the cylinder, and, adjacent its upper end, with an annular groove in which is mounted a packing ring 66. Two ports 67 communicate with the atmosphere and with the cylinder 1 between the ribs 65 and the other between the upper rib 65 and the packing ring 66 when the piston is in its normal position. Two ears 68 depend from the bottom of the piston and receive between them the upper end portion of a turn buckle 69 which is pivotally secured between the ears by a wrist pin 70. This turn buckle is provided at its lower end with an eye 71 which is pivotally secured between the spaced sleeve of a bracket 72 secured to the forward end of side sill $b$ of chassis $a$. As will be noted more clearly from Fig. 12, the lower rearward portion of the cylinder 59 is cut away at 73 to permit freedom of movement of the turn buckle 69. Cylinder 1 of the jack is rigidly secured by a screw stud and bolt means to a flattened plate or foot 74 at the forward end of a supporting bar 75, of channel cross section, the rearward or inner end of this bar being loosely connected by a shackle 76 and a bracket 77 to sill $b$. Bar 75 extends between a pair of blocks 78 to which blocks it is pivotally secured by a pin 79 for rocking movement about an axis disposed centrally of and parallel with the front axle $c$ of the automobile. The blocks are supported by means of bolts 80 which pass through clamping plates 81 the upper end portions $81^a$ of which are shaped to engage about the axle $c$ for securing the blocks thereto. Each of the bolts 80 is provided with an annular shoulder 82 which limits movement of the bolt through the clamping plate so as to position the plates properly relative to the axle. Each block 78 is urged forwardly of the automobile by means of expansion coil springs 83 mounted about the bolts and confined between block 78 and the rearward clamping plate 81. This provides simple and efficient means for urging the supporting bar 75 and the parts carried thereby forwardly of the automobile and resisting rearward movement of these members. Cylinder 1 of the jack is provided with a forwardly projecting lug 84 which is bored for the reception of a spacing rod 85 secured therethrough, this rod serving to hold the jacks and parts associated therewith in proper spaced relation. A bumper 86 of known construction is secured to the lugs 84 by means of suitable clamps 87 and cap screws associated therewith, or in any other suitable or preferred manner, the jacks thus providing supporting structures which are rigidly secured to the shock absorbers and to the supporting bars and which support the bumper. In the event of the bumper 86 striking an object it will act in a known manner to absorb the shocks and prevent any damage either to the automobile or to the object struck. If the impact between the bumper and an object struck is unusually severe the supporting bars 75 will be moved rearwardly against the action of springs 83. This rearward movement of the supporting bar will cause downward movement of the jack and the shock absorber carried thereby so that spring 63 of the shock absorber will be compressed and will assist the springs 83 in resisting rearward movement of the supporting arm. During travel of the automobile the shock absorber will act effectually to absorb shocks due to unevenness in the road surface. In practice, the spring 63 is placed under compression of approximately 65 pounds when the automobile is supported on a level or horizontal surface. The amount of compression of the spring can be adjusted to suit the particular automobile in connection with which the shock absorber is used by means of the turn buckle 69. As will be noted from the Figures 1 and 2, when the shock absorber is mounted on the automobile, the pin 70 is disposed transversely thereof or parallel with the front axle and the axis of the pivotal connection 70ª between the lower end of the turn buckle and the bracket 72 is similarly disposed. This permits movement of the shock absorber to accommodate movement of the supporting bar 75 and associated parts as well as movement of the chassis of the automobile. As previously stated, the piston 62 is a working fit in cylinder 59 so that, when the piston is downwardly moved within the cylinder a partial vacuum is produced in the cylinder above the pistons, this vacuum increasing with the downward movement of the piston and producing increasing resistance to such movement which has a very desirable cushioning effect. When the piston has been moved into its extreme lowermost position packing ring 66 is positioned below the upper bar 67, at which time air rushes into the piston above the cylinder, so that upon the return stroke, this air is subjected to compression, and as it can escape but very slowly between the ribs 65 and packing ring 66 and the surounding wall of the cylinder, a cushioning effect is produced which resists upward movement of the piston. To assist in this operation, and reduce resistance to a minimum, the piston is filled with oil by removing the plug 61 and, in practice, is usually kept approximately completely filled. During the expansion and compression of spring 63 which takes place when the shock absorber is in use, this oil will work its way to the inner face of the cylinder and will act to lubricate the same, assisting in maintaining a snug closure about the piston and also serving to lubricate the piston and the inner wall of the cylinder, as well as the springs, reducing friction to a minimum.

Supporting rods 75ª are positioned at the rear of the chassis $a$ and are rockably mounted at 79ª in blocks 78ª secured by U-bolts 88 to the rear axle housing. The rear jacks and associated parts are secured together to the chassis of the automoble in the same manner as the front jacks and the manner of mounting and securing the same need not, therefore, be described in detail.

As will be understood, and as above indicated, changes in the construction and arrangement of parts of the invention may be resorted to without departing from the field and scope of the same, and I intend to include all such variations, as fall within the scope of the appended claims, in this application in which a preferred form only of my invention is disclosed.

What I claim is:

1. In a pneumatic jack, a cylinder, a piston operating in the cylinder, a barrel depending from said piston, means for normally holding the barrel in raised position within the cylinder, means for locking the barrel in projected position beyond the cylinder, said cylinder being provided at one end with an opening accommodating the barrel during operation thereof, means for releasing the barrel and projecting it out of the cylinder and then moving said locking means into operative position and for moving the locking means into inoperative position and retracting the barrel into the cylinder and then moving said holding means into operative position.

2. In a pneumatic jack, a cylinder, a piston operating in the cylinder, a barrel depending from and secured to said piston, the cylinder having an opening in its lower end accommodating the barrel, means for holding the barrel in retracted position within the cylinder, means for locking the barrel in projected position beyond the cylinder, means for admitting air under pressure between the piston and the upper end of the cylinder and releasing the holding means to permit of the barrel being projected and then moving said locking means into operative position or for moving the locking means into inoperative position and admitting air under pressure between the piston and the lower end of the cylinder for retracting the barrel and then releasing the holding means, optionally.

3. In a pneumatic jack, a cylinder, a piston operating in the cylinder, a barrel secured to and depending from the piston, the cylinder having an opening in its lower end accommodating the barrel, locking dogs carried by the barrel adjacent the upper end thereof and disposed to engage beneath the bottom of the piston when the barrel is projected and to hold said barrel in said position, holding dogs carried by the barrel adjacent the lower end thereof and disposed to engage the inner face of the bottom wall of the cylinder to hold the barrel in retracted position, and means for moving the dogs into inoperative positions and subsequently admitting air under pressure between the main piston and the top of the cylinder and moving the dogs into operative positions after the barrel has been projected, or for moving the dogs into inoperative positions and subsequently admitting air under pressure between the piston and the bottom wall of the cylinder and moving the dogs into operative positions when the barrel has been moved into retracted position within the cylinder, optionally.

4. In a pneumatic jack, a cylinder, a piston operating in the cylinder, a barrel secured to and depending from the piston, the cylinder having an opening in its lower end accommodating the barrel, locking dogs carried by the barrel adjacent the upper end thereof, said dogs being disposed for sliding movement transversely of the barrel and normally projecting beyond the same, holding dogs carried by the barrel adjacent the lower end thereof and mounted and disposed similarly to said locking dogs, and means for retracting the dogs and then admitting air under pressure between the piston and the top wall of the cylinder for projecting the barrel and releasing the dogs when the barrel is in projected position or for retracting the dogs and admitting air under pressure between the piston and the bottom wall of the cylinder for drawing the barrel into the cylinder and then releasing the dogs when said barrel is in inoperative position within the cylinder.

5. In a pneumatic jack, a cylinder, a piston operating in the cylinder, a barrel secured to and depending from the piston, the cylinder having an opening in its lower end accommodating the barrel, locking dogs carried by the barrel adjacent the upper end thereof, said dogs being disposed for sliding movement transversely of the barrel and normally projecting beyond the same, holding dogs carried by the barrel adjacent the lower end thereof and mounted and disposed similarly to said locking dogs, and means for retracting the dogs and then admitting air under pressure between the piston and the adjacent end wall of the cylinder when the barrel is in either one of its extreme positions and for releasing the dogs when the barrel has been moved into its other extreme position.

6. In a pneumatic jack, a cylinder, a main piston operating in the cylinder, a barrel secured to and depending from the piston, the cylinder having an opening in its lower end accommodating the barrel, locking dogs carried by the barrel adjacent the upper end thereof, said dogs being disposed for sliding movement transversely of the barrel and normally projecting beyond the same, holding dogs carried by the barrel adjacent the lower end thereof and mounted and disposed similarly to said locking dogs, a supplemental piston operating in the barrel beneath the main piston, means urging the supplemental piston toward the main piston and for retracting the dogs when the supplemental piston is moved away from the main piston, and means for admitting air under pressure between the main piston and the supplemental piston and subsequently between said main piston and the adjacent end wall of the cylinder when the main piston is in either one of the extreme positions and for releasing the air from between the pistons when the main piston reaches its other extreme position in the cylinder.

7. In a pneumatic jack, a cylinder, a main piston operating in the cylinder, a barrel secured to and depending from the piston, the cylinder having an opening in its lower end accommodating the barrel, locking dogs carried by the barrel adjacent the upper end thereof, said dogs being disposed for sliding movement transversely of the barrel and normally projecting beyond the same, holding dogs carried by the barrel adjacent the lower end thereof and mounted and disposed similarly to said locking dogs, said dogs being provided with vertical slots, a cross-head carried by the supplemental piston and provided with depending arms extending into the slots of the locking dogs and having their inner faces inclined upwardly and inwardly of the barrel and contacting with the inner end walls of the slots, releasing rods connected to the cross-heads for movement therewith and provided with heads extending into the slots of the holding dogs and having their inner faces inclined upwardly and inwardly of the barrel and contacting with the inner end walls of the slots of said holding dogs, means for manually holding said rods raised, and means for admitting air under pressure between the pistons and subsequently between the main piston and the adjacent end wall of the cylinder when the main piston is in either one of its extreme positions and for releasing the air from between the pistons when the main piston reaches its other extreme position in the cylinder.

8. In a pneumatic jack, a cylinder provided adjacent each end with a port opening directly into the cylinder and with a duct communicating with the port and with the cylinder closely adjacent the end wall thereof, a main piston operating in the cylinder, a barrel secured to and depending from the piston, the cylinder having an opening in its lower end accommodating the barrel, locking dogs carried by the barrel adjacent the upper end thereof, said dogs being disposed for sliding movement transversely of the barrel and normally projecting beyond the same, holding dogs carried by the barrel adjacent the lower end thereof and mounted and disposed similarly to said locking dogs, said dogs being provided with vertical slots, and a cross-head carried by the supplemental piston and provided with depending arms extending into the slots of the locking dogs and having their inner faces inclined upwardly and inwardly of the barrel and contacting with the inner end walls of the slots, the main piston being provided in its outer face with an air passage extending about the same and with a duct communicating with said channel and with the space between the pistons, said channel being disposed to register with the corresponding port of the cylinder when the main piston is in either of its extreme positions in said cylinder.

In testimony whereof I affix my signature.

RAYMOND D. SCOTT.